(12) United States Patent
Han et al.

(10) Patent No.: US 10,942,271 B2
(45) Date of Patent: Mar. 9, 2021

(54) DETERMINING AN ANGLE BETWEEN A TOW VEHICLE AND A TRAILER

(71) Applicant: TuSimple, Inc., San Diego, CA (US)

(72) Inventors: Xiaoling Han, San Diego, CA (US);
Charles A. Price, Los Altos, CA (US);
Todd Skinner, Lakeside, CA (US);
Kaixin Zheng, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 121 days.

(21) Appl. No.: 16/174,980

(22) Filed: Oct. 30, 2018

(65) Prior Publication Data

US 2020/0132835 A1 Apr. 30, 2020

(51) Int. Cl.
| | | |
|---|---|---|
| *G01S 15/42* | (2006.01) | |
| *G01S 15/931* | (2020.01) | |
| *B62D 63/08* | (2006.01) | |
| *B62D 53/06* | (2006.01) | |
| *G05D 1/02* | (2020.01) | |

(52) U.S. Cl.
CPC ............ *G01S 15/42* (2013.01); *G01S 15/931* (2013.01); *B62D 53/06* (2013.01); *B62D 63/08* (2013.01); *G01S 2015/937* (2013.01); *G05D 1/0255* (2013.01)

(58) Field of Classification Search
CPC ...... B62D 63/08; B62D 19/00; G05D 1/0255; B60D 1/24
USPC ........................................................ 701/300
See application file for complete search history.

(56) References Cited

U.S. PATENT DOCUMENTS

| | | | |
|---|---|---|---|
| 6,084,870 | A | 7/2000 | Wooten et al. |
| 6,263,088 | B1 | 7/2001 | Crabtree |
| 6,594,821 | B1 | 7/2003 | Banning et al. |
| 6,777,904 | B1 | 8/2004 | Degner |

(Continued)

FOREIGN PATENT DOCUMENTS

| | | |
|---|---|---|
| CN | 106340197 A | 1/2017 |
| CN | 106781591 A | 5/2017 |

(Continued)

OTHER PUBLICATIONS

Carle, Patrick J.F. et al. "Global Rover Localization by Matching Lidar and Orbital 3D Maps." IEEE, Anchorage Convention District, pp. 1-6, May 3-8, 2010. (Anchorage Alaska, US).

(Continued)

*Primary Examiner* — Tan Q Nguyen
(74) *Attorney, Agent, or Firm* — Paul Liu; Julie J. Muyco; Perkins Cole, LLP

(57) ABSTRACT

The angle of a trailer with respect to a tow vehicle is an important parameter to the stability of the vehicle and trailer. A tow vehicle pulling a trailer in a straight line is generally more stable than when the vehicle is turning. While turning, the angle between the tow vehicle and the trailer is not a straight line but is another angle depending on how sharply the tow vehicle is turning. To safely operate a vehicle towing a trailer, for a given steering input and speed, there is a maximum angle between the tow vehicle and trailer whereby exceeding the angle causes instability and may cause the trailer or tow vehicle to roll over or jackknife. Accordingly, the angle between the trailer and tow vehicle must be determined to ensure the vehicle and trailer will continue to be in control.

20 Claims, 9 Drawing Sheets

(56) References Cited

U.S. PATENT DOCUMENTS

| | | |
|---|---|---|
| 6,975,923 B2 | 12/2005 | Spriggs |
| 7,103,460 B1 | 9/2006 | Breed |
| 7,689,559 B2 | 3/2010 | Canright |
| 7,742,841 B2 | 6/2010 | Sakai et al. |
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,346,480 B2 | 1/2013 | Trepagnier et al. |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,532,870 B2 * | 9/2013 | Hoetzer ............... B60T 8/1708 280/656 |
| 8,553,088 B2 | 10/2013 | Stein |
| 8,706,394 B2 | 4/2014 | Trepagnier et al. |
| 8,718,861 B1 | 5/2014 | Montemerlo et al. |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,983,708 B2 | 3/2015 | Choe et al. |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,081,385 B1 | 7/2015 | Ferguson et al. |
| 9,088,744 B2 | 7/2015 | Grauer et al. |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,214,084 B2 | 12/2015 | Grauer et al. |
| 9,219,873 B2 | 12/2015 | Grauer et al. |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,282,144 B2 | 3/2016 | Tebay et al. |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-Guzman |
| 9,317,776 B1 | 4/2016 | Honda |
| 9,330,334 B2 | 5/2016 | Lin |
| 9,342,074 B2 | 5/2016 | Dolgov |
| 9,347,779 B1 | 5/2016 | Lynch |
| 9,355,635 B2 | 5/2016 | Gao |
| 9,365,214 B2 | 6/2016 | Ben Shalom |
| 9,399,397 B2 | 7/2016 | Mizutani |
| 9,418,549 B2 | 8/2016 | Kang et al. |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,483,839 B1 | 11/2016 | Kwon |
| 9,490,064 B2 | 11/2016 | Hirosawa |
| 9,494,935 B2 | 11/2016 | Okumura et al. |
| 9,507,346 B1 | 11/2016 | Levinson et al. |
| 9,513,634 B2 | 12/2016 | Pack et al. |
| 9,531,966 B2 | 12/2016 | Stein |
| 9,535,423 B1 | 1/2017 | Debreczeni |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,555,803 B2 | 1/2017 | Pawlicki |
| 9,568,915 B1 | 2/2017 | Berntorp |
| 9,587,952 B1 | 3/2017 | Slusar |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,612,123 B1 | 4/2017 | Levinson et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,652,860 B1 | 5/2017 | Maali |
| 9,669,827 B1 | 6/2017 | Ferguson et al. |
| 9,672,446 B1 | 6/2017 | Vallesi-Gonzalez |
| 9,690,290 B2 | 6/2017 | Prokhorov |
| 9,701,023 B2 | 7/2017 | Zhang et al. |
| 9,712,754 B2 | 7/2017 | Grauer et al. |
| 9,720,418 B2 | 8/2017 | Stenneth |
| 9,723,097 B2 | 8/2017 | Harris |
| 9,723,099 B2 | 8/2017 | Chen |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,738,280 B2 | 8/2017 | Rayes |
| 9,739,609 B1 | 8/2017 | Lewis |
| 9,746,550 B2 | 8/2017 | Nath |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 9,953,236 B1 | 4/2018 | Huang |
| 10,147,193 B2 | 12/2018 | Huang |
| 10,223,806 B1 | 3/2019 | Yi et al. |
| 10,223,807 B1 | 3/2019 | Yi et al. |
| 10,410,055 B2 | 9/2019 | Wang et al. |
| 2003/0114980 A1 | 6/2003 | Klausner et al. |
| 2003/0174773 A1 | 9/2003 | Comaniciu |
| 2004/0264763 A1 | 12/2004 | Mas et al. |
| 2007/0067077 A1 * | 3/2007 | Liu ....................... B60R 1/025 701/31.4 |
| 2007/0183661 A1 | 8/2007 | El-Maleh |
| 2007/0183662 A1 | 8/2007 | Wang |
| 2007/0230792 A1 | 10/2007 | Shashua |
| 2007/0286526 A1 | 12/2007 | Abousleman |
| 2008/0249667 A1 | 10/2008 | Horvitz |
| 2009/0040054 A1 | 2/2009 | Wang |
| 2009/0087029 A1 | 4/2009 | Coleman |
| 2010/0049397 A1 | 2/2010 | Lin |
| 2010/0111417 A1 | 5/2010 | Ward |
| 2010/0226564 A1 | 9/2010 | Marchesotti |
| 2010/0281361 A1 | 11/2010 | Marchesotti |
| 2011/0142283 A1 | 6/2011 | Huang |
| 2011/0206282 A1 | 8/2011 | Aisaka |
| 2011/0247031 A1 | 10/2011 | Jacoby |

(56) References Cited

U.S. PATENT DOCUMENTS

| | | | |
|---|---|---|---|
| 2011/0257860 A1* | 10/2011 | Getman | G01S 13/931 |
| | | | 701/70 |
| 2012/0041636 A1 | 2/2012 | Johnson et al. | |
| 2012/0105639 A1 | 5/2012 | Stein | |
| 2012/0140076 A1 | 6/2012 | Rosenbaum | |
| 2012/0274629 A1 | 11/2012 | Baek | |
| 2012/0314070 A1 | 12/2012 | Zhang et al. | |
| 2013/0051613 A1 | 2/2013 | Bobbitt et al. | |
| 2013/0083959 A1 | 4/2013 | Owechko | |
| 2013/0182134 A1 | 7/2013 | Grundmann et al. | |
| 2013/0204465 A1 | 8/2013 | Phillips et al. | |
| 2013/0266187 A1 | 10/2013 | Bulan | |
| 2013/0329052 A1 | 12/2013 | Chew | |
| 2014/0072170 A1 | 3/2014 | Zhang | |
| 2014/0104051 A1 | 4/2014 | Breed | |
| 2014/0142799 A1 | 5/2014 | Ferguson et al. | |
| 2014/0143839 A1 | 5/2014 | Ricci | |
| 2014/0145516 A1 | 5/2014 | Hirosawa | |
| 2014/0198184 A1 | 7/2014 | Stein | |
| 2014/0321704 A1 | 10/2014 | Partis | |
| 2014/0334668 A1 | 11/2014 | Saund | |
| 2015/0062304 A1 | 3/2015 | Stein | |
| 2015/0269438 A1 | 9/2015 | Samarsekera et al. | |
| 2015/0310370 A1 | 10/2015 | Burry | |
| 2015/0353082 A1 | 12/2015 | Lee et al. | |
| 2016/0008988 A1 | 1/2016 | Kennedy | |
| 2016/0026787 A1 | 1/2016 | Nairn et al. | |
| 2016/0037064 A1 | 2/2016 | Stein | |
| 2016/0094774 A1 | 3/2016 | Li | |
| 2016/0118080 A1 | 4/2016 | Chen | |
| 2016/0129907 A1 | 5/2016 | Kim | |
| 2016/0165157 A1 | 6/2016 | Stein | |
| 2016/0210528 A1 | 7/2016 | Duan | |
| 2016/0275766 A1 | 9/2016 | Venetianer et al. | |
| 2016/0280261 A1* | 9/2016 | Kyrtsos | B60D 1/62 |
| 2016/0321381 A1 | 11/2016 | English | |
| 2016/0334230 A1 | 11/2016 | Ross et al. | |
| 2016/0342837 A1 | 11/2016 | Hong et al. | |
| 2016/0347322 A1 | 12/2016 | Clarke et al. | |
| 2016/0375907 A1 | 12/2016 | Erban | |
| 2017/0053169 A1 | 2/2017 | Cuban et al. | |
| 2017/0061632 A1 | 3/2017 | Linder et al. | |
| 2017/0080928 A1* | 3/2017 | Wasiek | B62D 15/025 |
| 2017/0124476 A1 | 5/2017 | Levinson et al. | |
| 2017/0134631 A1 | 5/2017 | Zhao et al. | |
| 2017/0177951 A1 | 6/2017 | Yang et al. | |
| 2017/0301104 A1 | 10/2017 | Qian | |
| 2017/0305423 A1 | 10/2017 | Green | |
| 2017/0318407 A1 | 11/2017 | Meister et al. | |
| 2017/0334484 A1* | 11/2017 | Koravadi | B62D 15/027 |
| 2018/0057052 A1* | 3/2018 | Dodd | G01D 5/16 |
| 2018/0151063 A1 | 5/2018 | Pun | |
| 2018/0158197 A1 | 6/2018 | Dasgupta | |
| 2018/0260956 A1 | 9/2018 | Huang | |
| 2018/0283892 A1 | 10/2018 | Behrendt | |
| 2018/0373980 A1 | 12/2018 | Huval | |
| 2019/0025853 A1 | 1/2019 | Julian | |
| 2019/0065863 A1 | 2/2019 | Luo et al. | |
| 2019/0066329 A1 | 2/2019 | Yi et al. | |
| 2019/0066330 A1 | 2/2019 | Yi et al. | |
| 2019/0066344 A1 | 2/2019 | Yi et al. | |
| 2019/0084477 A1* | 3/2019 | Gomez-Mendoza | G06T 7/60 |
| 2019/0108384 A1 | 4/2019 | Wang et al. | |
| 2019/0132391 A1 | 5/2019 | Thomas | |
| 2019/0132392 A1 | 5/2019 | Liu | |
| 2019/0170867 A1* | 6/2019 | Wang | G01S 7/411 |
| 2019/0210564 A1 | 7/2019 | Han | |
| 2019/0210613 A1 | 7/2019 | Sun | |
| 2019/0236950 A1 | 8/2019 | Li | |
| 2019/0266420 A1 | 8/2019 | Ge | |

FOREIGN PATENT DOCUMENTS

| | | |
|---|---|---|
| CN | 108010360 A | 5/2018 |
| DE | 2608513 A1 | 9/1977 |
| DE | 102016105259 A1 | 9/2016 |
| DE | 102017125662 A1 | 5/2018 |
| EP | 890470 B1 | 1/1999 |
| EP | 1754179 A1 | 2/2007 |
| EP | 2448251 A2 | 5/2012 |
| EP | 2448251 A3 | 5/2012 |
| EP | 2463843 A2 | 6/2012 |
| EP | 2761249 A1 | 8/2014 |
| EP | 2946336 A2 | 11/2015 |
| EP | 2993654 A1 | 3/2016 |
| EP | 3081419 A1 | 10/2016 |
| GB | 2513392 A | 10/2014 |
| KR | 100802511 A1 | 2/2008 |
| WO | 1991009375 A1 | 6/1991 |
| WO | 2005098739 A1 | 10/2005 |
| WO | 2005098751 A1 | 10/2005 |
| WO | 2005098782 A1 | 10/2005 |
| WO | 2010109419 A | 9/2010 |
| WO | 2013045612 A1 | 4/2013 |
| WO | 2014111814 A2 | 7/2014 |
| WO | 2014166245 A1 | 10/2014 |
| WO | 2014201324 A1 | 12/2014 |
| WO | 2015083009 A1 | 6/2015 |
| WO | 2015103159 A1 | 7/2015 |
| WO | 2015125022 A2 | 8/2015 |
| WO | 2015186002 A2 | 12/2015 |
| WO | 2016090282 A1 | 6/2016 |
| WO | 2016135736 A2 | 9/2016 |
| WO | 2017079349 A1 | 5/2017 |
| WO | 2017079460 A2 | 5/2017 |
| WO | 2017013875 A1 | 5/2018 |
| WO | 2019040800 A1 | 2/2019 |
| WO | 2019084491 A1 | 5/2019 |
| WO | 2019084494 A1 | 5/2019 |
| WO | 2019140277 A2 | 7/2019 |
| WO | 2019168986 A1 | 9/2019 |

OTHER PUBLICATIONS

Caselitz, T. et al., "Monocular camera localization in 3D LiDAR maps," European Conference on Computer Vision (2014) Computer Vision—ECCV 2014. ECCV 2014. Lecture Notes in Computer Science, vol. 8690. Springer, Cham.

Mur-Artal, R. et al., "ORB-SLAM: A Versatile and Accurate Monocular SLAM System," IEEE Transaction on Robotics, Oct. 2015, pp. 1147-1163, vol. 31, No. 5, Spain.

Sattler, T. et al., "Are Large-Scale 3D Models Really Necessary for Accurate Visual Localization?" CVPR, IEEE, 2017, pp. 1-10.

Engel, J. et la. "LSD-SLAM: Large Scare Direct Monocular SLAM," pp. 1-16, Munich.

Levinson, Jesse et al., Experimental Robotics, Unsupervised Calibration for Multi-Beam Lasers, pp. 179-194, 12th Ed., Oussama Khatib, Vijay Kumar, Gaurav Sukhatme (Eds.) Springer-Verlag Berlin Heidelberg 2014.

International Application No. PCT/US2019/013322, International Search Report and Written Opinion dated Apr. 2, 2019.

International Application No. PCT/US19/12934, International Search Report and Written Opinion dated Apr. 29, 2019.

International Application No. PCT/US18/53795, International Search Report and Written Opinion dated Dec. 31, 2018.

International Application No. PCT/US18/57484, International Search Report and Written Opinion dated Jan. 7, 2019.

International Application No. PCT/US2018/057851, International Search Report and Written Opinion dated Feb. 1, 2019.

International Application No. PCT/US2019/019839, International Search Report and Written Opinion dated May 23, 2019.

International Application No. PCT/US19/25995, International Search Report and Written Opinion dated Jul. 9, 2019.

Geiger, Andreas et al., "Automatic Camera and Range Sensor Calibration using a single Shot", Robotics and Automation (ICRA), pp. 1-8, 2012 IEEE International Conference.

(56) References Cited

OTHER PUBLICATIONS

Zhang, Z. et al. A Flexible new technique for camera calibration. IEEE Transactions on Pattern Analysis and Machine Intelligence (vol. 22, Issue: 11, Nov. 2000).
International Application No. PCT/US2018/047830, International Search Report and Written Opinion dated Apr. 27, 2017.
Bar-Hillel, Aharon et al. "Recent progress in road and lane detection: a survey." Machine Vision and Applications 25 (2011): 727-745.
Schindler, Andreas et al. "Generation of high precision digital maps using circular arc splines," 2012 IEEE Intelligent Vehicles Symposium, Alcala de Henares, 2012, pp. 246-251. doi: 10.1109/IVS. 2012.6232124.
International Application No. PCT/US2018/047608, International Search Report and Written Opinion dated Dec. 28, 2018.
Hou, Xiaodi and Zhang, Liqing, "Saliency Detection: A Spectral Residual Approach", Computer Vision and Pattern Recognition, CVPR'07—IEEE Conference, pp. 1-8, 2007.
Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.
Hou, Xiaodi and Zhang, Liqing, "Dynamic Visual Attention: Searching for Coding Length Increments", Advances in Neural Information Processing Systems, vol. 21, pp. 681-688, 2008.
Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302. 5985, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yanghao and Wang, Naiyan and Liu, Jiaying and Hou, Xiaodi, "Demystifying Neural Style Transfer", arXiv preprint arXiv:1701. 01036, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.
Li, Yanghao and Wang, Naiyan and Liu, Jiaying and Hou, Xiaodi, "Factorized Bilinear Models for Image Recognition", arXiv preprint arXiv:1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 Issue 12, pp. 1498-1515 Article first published online: Oct. 7, 2010; Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
Kyoungho Ahn, Hesham Rakha, "The Effects of Route Choice Decisions on Vehicle Energy Consumption and Emissions", Virginia Tech Transportation Institute, Blacksburg, VA 24061, date unknown.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612. 06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", in Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703. 04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611. 09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.

(56) References Cited

OTHER PUBLICATIONS

Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Office Action Mailed in Chinese Application No. 201810025516.X, dated Sep. 3, 2019.
Luo, Yi et al. U.S. Appl. No. 15/684,389 Notice of Allowance dated Oct. 9, 2019.
International Application No. PCT/US19/58863, International Search Report and Written Opinion dated Feb. 14, 2020, pp. 1-11.

* cited by examiner

700

710 — Receiving, from each of one or more ultrasonic sensors, a distance between each ultrasonic sensor and a front-end of the trailer attached to the vehicle 720 — Determining one or more angles, each angle corresponding to a distance received from the one or more ultrasonic sensors, wherein each angle is between the vehicle and the trailer, and wherein a trailer angle is determined from the one or more angles

*FIG. 7*

DETERMINING AN ANGLE BETWEEN A TOW VEHICLE AND A TRAILER

TECHNICAL FIELD

This document relates to determining the angle between a tow vehicle and a trailer being towed.

BACKGROUND

Many different types of vehicles are used to tow a variety of different types of trailers. For example, commercial semi-trailer trucks, also known as semis, tractor-trailers, big rigs, eighteen-wheelers, or transports include a tractor towing one or more trailers. Other non-commercial vehicles such as pick-up trucks, motorhomes, recreational vehicles, and sport-utility vehicles also tow trailers, boats, campers, and other types of trailers. In each of the above examples, the stability of the trailer and tow vehicle depends on multiple factors such as the speed of the trailer and tow vehicle, the weather conditions such as wind and rain, the length of trailer, the number of axles, the angle between tow vehicle and the trailer, and others. New techniques are needed to measure the angle between the trailer and tow vehicle that are reliable, accurate, have a long service life, and are inexpensive.

SUMMARY

Disclosed are devices, systems and methods for determining an angle such as the angle that a trailer is towed behind a vehicle. In one aspect, a system for determining a trailer angle between a trailer and a vehicle is disclosed. The system includes one or more ultrasonic sensors, wherein each ultrasonic sensor is mountable to the vehicle to determine a distance from the ultrasonic sensor to a front-end of a trailer attached to the vehicle. The system further includes an ultrasonic control unit configured to receive the distance from each of the one or more ultrasonic sensors via a communications interface, wherein the ultrasonic control unit determines one or more angles, each angle corresponding to a distance received from the one or more ultrasonic sensors, wherein each angle is between the vehicle and the trailer, and wherein the ultrasonic control unit determines the trailer angle from the one or more angles.

In another aspect, a method for determining a trailer angle between a trailer and a vehicle is disclosed. The method includes receiving, from each of one or more ultrasonic sensors attached to the vehicle, information about a distance between each ultrasonic sensor and a front-end of the trailer attached to the vehicle, and determining one or more angles, each angle corresponding to the information about the distance received from the one or more ultrasonic sensors, wherein each angle is an estimate of alignment between the vehicle and the trailer, and wherein a trailer angle is determined from the one or more angles.

In another aspect, a non-transitory computer readable medium is disclosed. The non-transitory computer readable medium stores executable instructions for determining a trailer angle between a trailer and a vehicle that when executed by at least one processor perform at least the following: receiving, from each of one or more ultrasonic sensors, a distance between each ultrasonic sensor and a front-end of the trailer attached to the vehicle, and determining one or more angles, each angle corresponding to a distance received from the one or more ultrasonic sensors, wherein each angle is between the vehicle and the trailer, and wherein a trailer angle is determined from the one or more angles.

The following features can be included in various combinations. A first angle corresponding to a first ultrasonic sensor can be determined based on one or more geometrical relationships between a position of the first ultrasonic sensor and the front-end of the trailer. The trailer angle can be determined as an average angle of the one or more angles. The average angle can be weighted based on a standard deviation for distance values received at the ultrasonic control unit from each of the one or more ultrasonic sensors. The ultrasonic control unit can determine an error interval and a confidence level based on the standard deviation for distance values received at the ultrasonic control unit from each of the one or more ultrasonic sensors. The first angle can be determined from: a first neutral distance between the first ultrasonic sensor and the front-end of the trailer when the trailer is in line with the vehicle, a first angled distance when the trailer is angled with respect to the vehicle, and/or a first offset distance between the center of the first ultrasonic sensor and the center of the tractor. The first neutral distance can be determined when a steering angle of the vehicle is about zero degrees and the vehicle is travelling at about 10 kilometers per hour or more. The ultrasonic control unit can include at least one processor, at least one memory storing executable instructions that when executed by the at least one processor perform at least the following determining the first angle corresponding to a first ultrasonic sensor as: $A_1 = \text{arctangent}((D_{1\text{-}1} - D_{1\text{-}2})/\text{Dis}1)$, wherein $A_1$ is the first angle between the vehicle and the trailer, wherein $D_{1\text{-}1}$ is a first neutral distance between the first ultrasonic sensor and the front-end of the trailer, wherein the first neutral distance is determined when the trailer is in line with the vehicle, wherein $D_{1\text{-}2}$ is a first angled distance between the first ultrasonic sensor and the front-end of the trailer, wherein the first angled distance is determined when the trailer is angled with respect to the vehicle, and wherein Dis1 is a first offset distance, wherein the first offset distance is between the center of the first ultrasonic sensor and the center of the vehicle.

The above and other aspects and features of the disclosed technology are described in greater detail in the drawings, the description and the claims.

BRIEF DESCRIPTION OF THE DRAWINGS

FIG. 7 depicts an example of a process, in accordance with some example embodiments.

DETAILED DESCRIPTION

The angle of a trailer with respect to a tow vehicle is an important parameter to the stability of the vehicle and trailer. A tow vehicle pulling a trailer in a straight line is generally more stable than when the vehicle is turning. While turning, the angle between the tow vehicle and the trailer is not a straight line but is another angle depending on how sharply the tow vehicle is turning. To safely operate a vehicle towing a trailer, for a given steering input and speed, there is a maximum angle between the tow vehicle and trailer whereby exceeding the angle causes instability and may cause the trailer or tow vehicle to roll over or jackknife. Accordingly, the angle between the trailer and tow vehicle may be determined to ensure the vehicle and trailer will continue to be in control. A trailer angle sensor system should provide high accuracy and redundancy to ensure the system is always operable even when one or more sensors are inoperable. This calculation becomes important when the vehicle is an autonomous vehicle and therefore lacks the benefit of judgment of a human driver regarding stability of the combination of the vehicle and the trailer when driving around curves.

Current trailer angle sensors have several limitations including: 1) Current trailer angle sensors need to be installed in trailers or at least have to be fixed to the trailer in order to determine the relative motion between trailer and tractor. This means the sensor needs to be reinstalled or recalibrated each time after changing the trailer; 2) Current techniques offer no redundancy since they use Hall effect devices or resistive position sensors; 3) The lifecycle of current trailer angle sensors is limited because they are typically mounted near the $5^{th}$ wheel which is often a harsh environment due to vibration, exposure to the elements, and chemicals such as lubricating grease.

Figure 1:
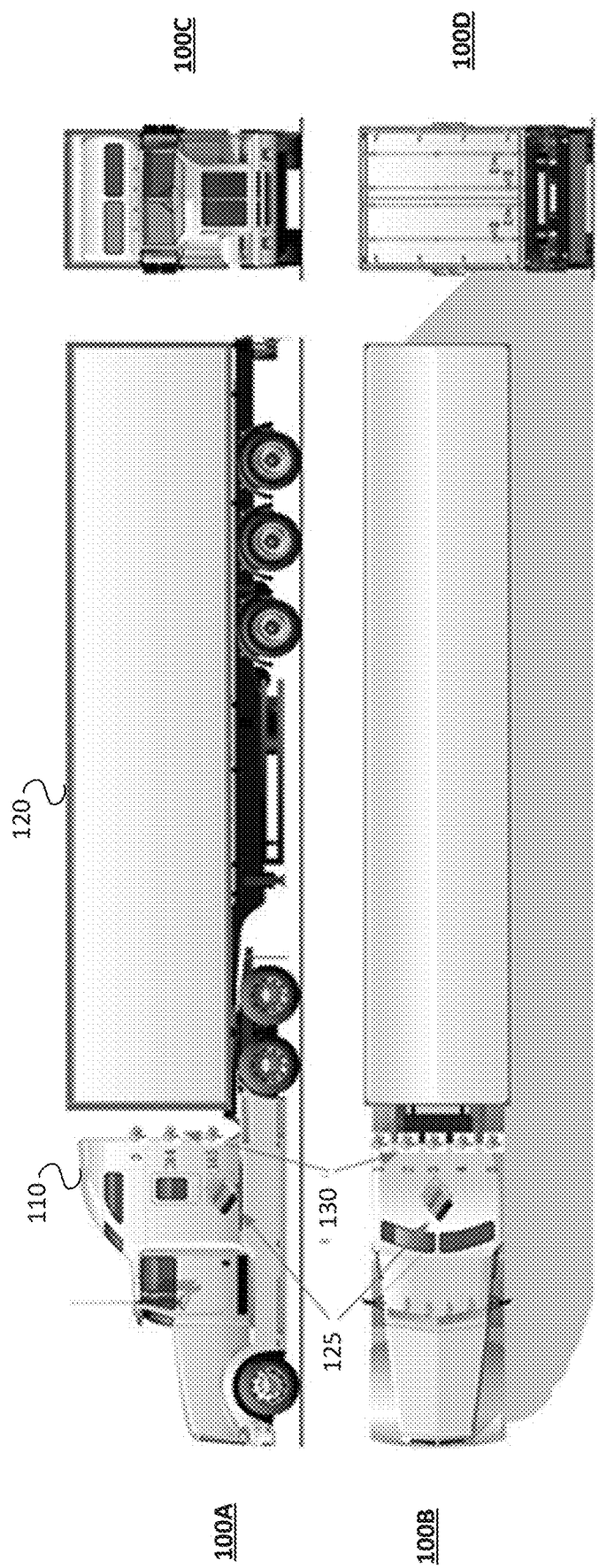
FIG. 1 depicts an example of an angle measurement system installed on a tractor, in accordance with some example embodiments.

FIG. 1 depicts an example of an angle measurement system installed on a tow vehicle (also referred to herein as a "tractor"), in accordance with some example embodiments. Tractor 110 is physically coupled to trailer 120. A side-view is shown at 100A, a top-view at 100B, a front-view at 100C, and a back-view at 100D. The tractor 110 includes a plurality of ultrasonic sensors 130 mounted to the back of the tractor with the ultrasonic beams directed to the front surface of the trailer. Each of the ultrasonic sensors determines or helps to determine the distance from the ultrasonic sensor to the front of the trailer 120. Using the distances, ultrasonic control unit 125 determines the angle between the tractor and the trailer. In FIG. 1, the tractor and trailer lie in a straight line. When the tractor trailer is turning, the tractor and trailer may no longer be in line and there would be an angle between the tractor and trailer (also referred to as the "trailer angle"). UCU 125 may include a processor and memory, and various interfaces such as one or more communications interfaces.

Figure 2:
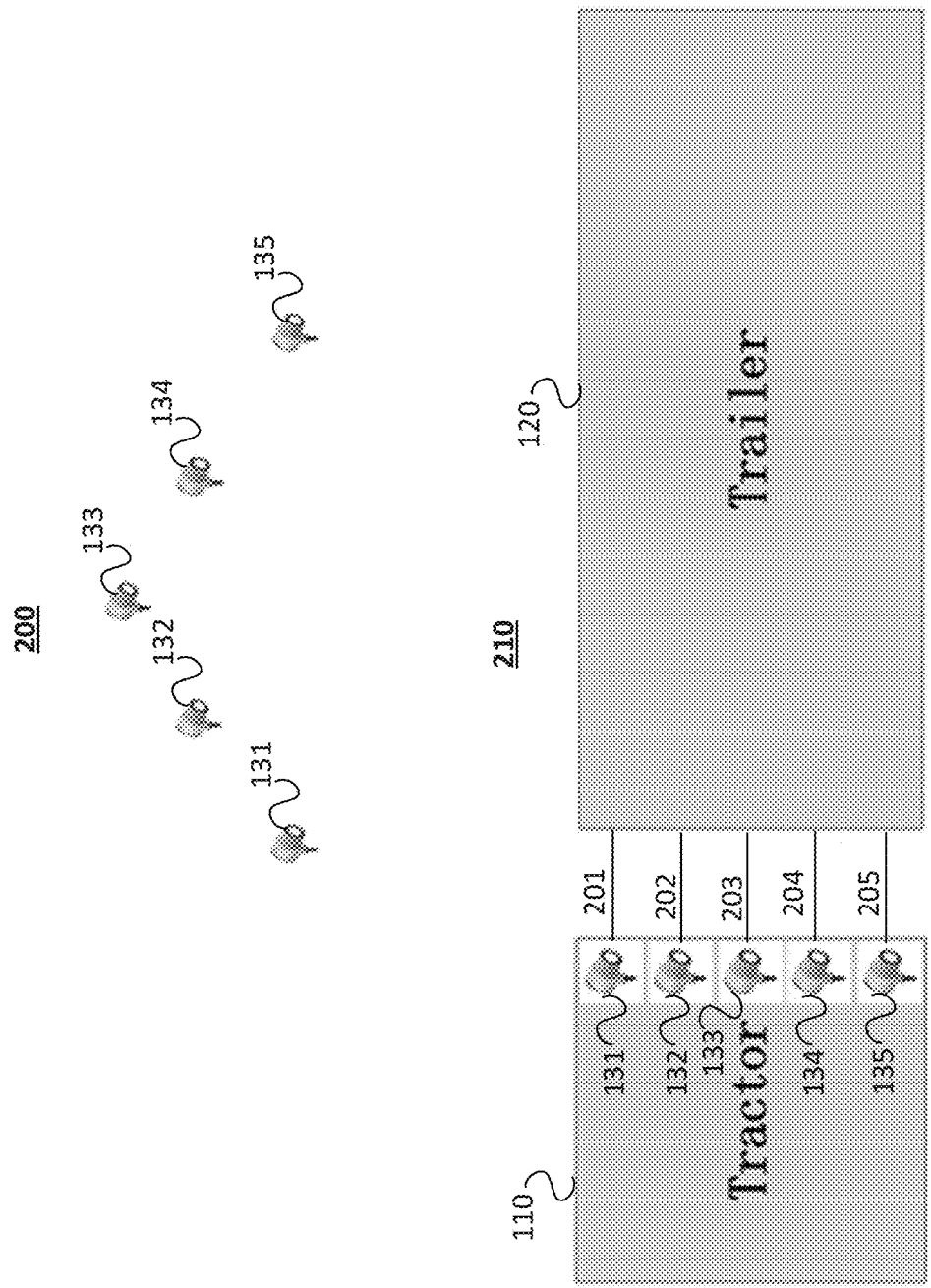
FIG. 2 depicts an example of an arrangement of ultrasonic sensors for measuring an angle between a tow vehicle and a trailer, in accordance with some example embodiments.

FIG. 2 depicts an example of an arrangement of ultrasonic sensors for measuring an angle between a tow vehicle and a trailer. In some example embodiments, the ultrasonic sensors 130 may be arranged as shown at 200. The sensor arrangement shown is an "inverted V" arrangement. For example, on the back of tractor 110 in FIG. 1, the five ultrasonic sensors 131-135 may be mounted in the "inverted V" configuration with ultrasonic sensor 133 highest above the roadway in the center (left-to-right) of the tractor, and ultrasonic sensors 131 and 135 mounted on the back of the tractor closest to the roadway compared to ultrasonic sensors 132-134. Although five sensors are shown at 200, a greater or smaller number of sensors may be used. Although the ultrasonic sensors 131-135 are shown in an "inverted V" configuration, the sensors may be attached in a different configuration, such as a straight line (flat or tilted), a "W" or "inverted W" configuration or in another pattern. Organizing ultrasonic sensors in a two-dimensional pattern in a plane that is perpendicular to the axis between the tractor and the trailer may lead to a more robust determination of the trailer angle. For example, placing the ultrasonic sensors in a pattern can avoid objects between the tow vehicle and trailer and can avoid surfaces that are not normal to the ultrasonic sensor ultrasound when the trailer is pulled in a straight line. These non-perpendicular surfaces may not be suitable for ultrasonic distance determination. For example, an object with an angled surface (non-perpendicular to illuminating ultrasound) attached to the trailer may be at an obtuse angle to an ultrasonic sensor at a range of trailer angles causing the distance determined by the ultrasonic sensor to be inaccurate or preventing a distance from being determined due to little or no reflected ultrasonic signal from the angled object. In some example embodiments, ultrasonic sensor may be oriented to illuminate the trailer with ultrasound at a perpendicular angle when the trailer angle is not zero degrees. By doing so, some ultrasonic sensors may provide better distance determinations at different trailer angles. In some example embodiments, the ultrasonic sensors may provide timing information such as a transmit time and a reception time from which a transit time to from the sensor to the trailer can be determined, or some ultrasonic sensors may determine the transit time. Form the transit time, the distance can be determined based on the speed of the ultrasound.

At 210 is an example illustration of a top-view of a tractor trailer showing ultrasonic sensors 131-135. Also shown are distances 201-205 from each ultrasonic sensor to the front of the trailer 120. Distances 201-205 may be referred to "neutral distances" because the trailer is in a straight line with the tow vehicle. Each ultrasonic sensor determines information indicative of the distance, or the distance between the sensor to the front of the trailer. As noted above, information indicative of the distance includes a transit time for the ultrasound to propagate to the trailer (one way or round trip) or timing information such as time stamps from which the transit time can be determined. In the following, "distance" is used, but as noted above time information can be provided by the sensor instead of distance. For example, ultrasonic sensor 131 determines that the trailer is distance 201 from ultrasonic sensor 131. Ultrasonic sensor 132 determines that the trailer is distance 202 from ultrasonic sensor 132. Ultrasonic sensor 133 determines that the trailer is distance 203 from ultrasonic sensor 133. Ultrasonic sensor 134 determines that the trailer is distance 204 from ultrasonic sensor 134, and ultrasonic sensor 135 determines that the trailer is distance 205 from ultrasonic sensor 135. With the tractor 110 and trailer 120 in a straight line as shown at 210, the distances 201-205 are approximately equal. In some embodiments, a fairing, wind deflector, or equipment such as cooling equipment for the trailer 120 may cause the distances 201-205 to not be equal when the trailer and tractor lie in a straight line. The non-equal distances can be corrected in the UCU. The distances are provided to the UCU. The UCU may control the ultrasonic sensors and may receive health and status information from the ultrasonic sensors.

Figure 3A:
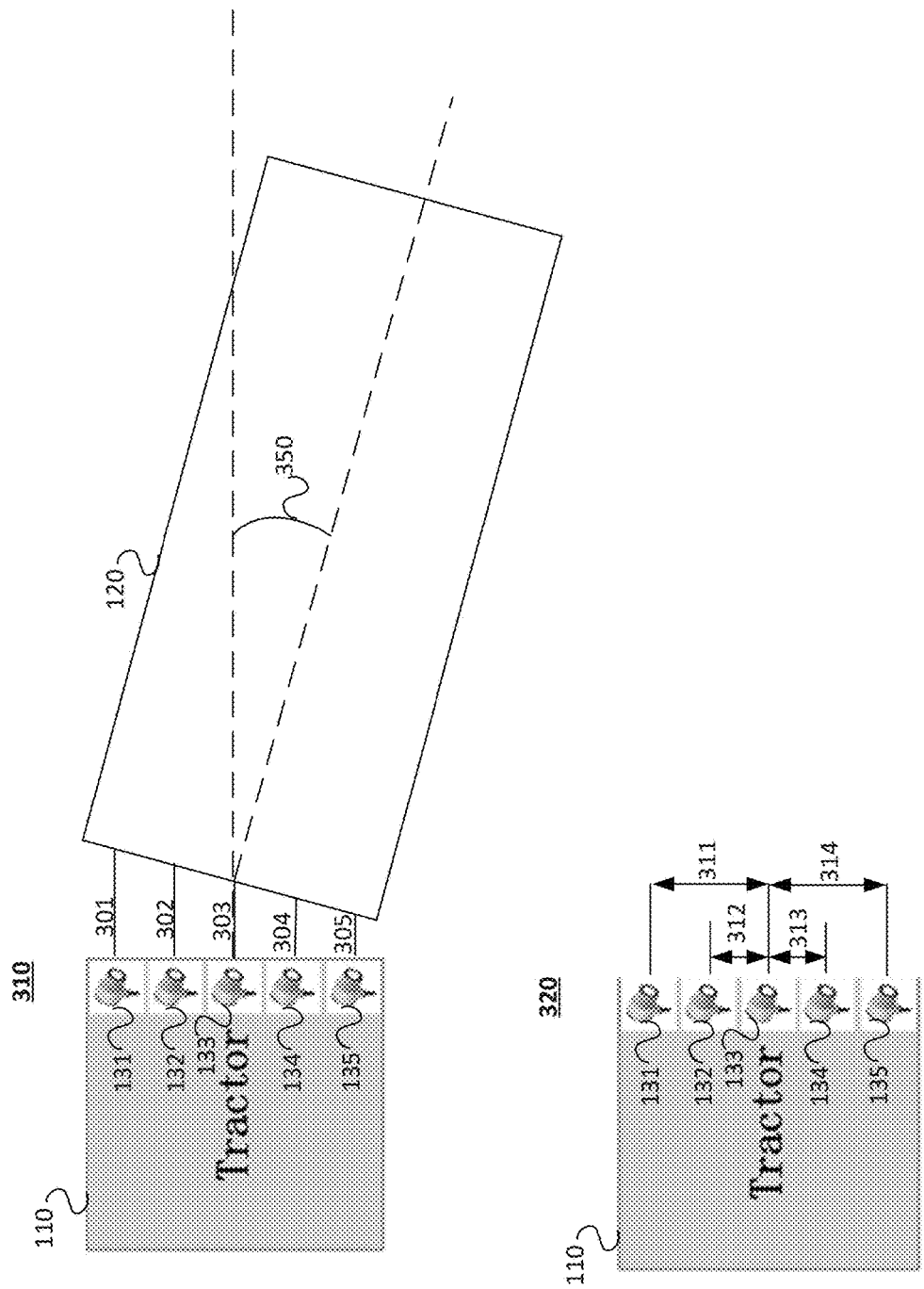
FIG. 3A depicts an illustration showing a trailer at an angle to a tow vehicle that is not a straight line, and various distances, in accordance with some example embodiments.

FIG. 3A depicts an example illustration showing an example of a trailer at an angle to a tow vehicle that is not a straight line, and various distances. At 310 is an illustration of a tractor 110 with a trailer 120 at an angle, trailer angle 350, to the trailer with ultrasonic sensors 131-135 attached to tractor 110. Each ultrasonic sensor determines the distance between the sensor to the front of the trailer as described above. In the example of FIG. 3A at 310, distance 301 is greater that distance 302, distance 302 is greater than distance 303, distance 303 is greater than distance 304, distance 304 is greater than distance 305. Distances 201-205 may be referred to "angled distances" because the trailer is not in a straight line with the tow vehicle. The distances are provided by ultrasonic sensors 131-135 to the UCU 125 and are used to determine the angle between the tractor 110 and trailer 120.

Shown at 320 is an illustration depicting distances 311-314 between the center of the center ultrasonic sensor 133 and the other ultrasonic sensors 131, 132, 134, and 135. Distances 311-314 are used in determining the angle between tractor 110 and trailer 120. Although distances 311-314 are shown from the center of one sensor to the center of another, other distances related to the spacing of the ultrasonic sensors may be used instead.

The UCU coordinates distance measuring by the sensors and determines the trailer angle based on the distances from the sensors. Coordination may include turning-on the sensors 131-135 individually at different times to prevent interference that could occur if multiple sensors were operating at the same time. In some example embodiments, the ultrasonic sensors may include a signature such as a pseudo-random noise (PN) code or other code, or the different sensors may modulate the emitted ultrasound to be orthogonal to other sensors. The UCU may also receive information including vehicle speed information, steering angle information, and the UCU may make zero clearing based on adapted control algorithm. The trailer angle may be sent to a vehicle dynamics controller, electronic stability controller (ESC), or vehicle stability controller (VSC) of the tow vehicle.

Figure 3B:
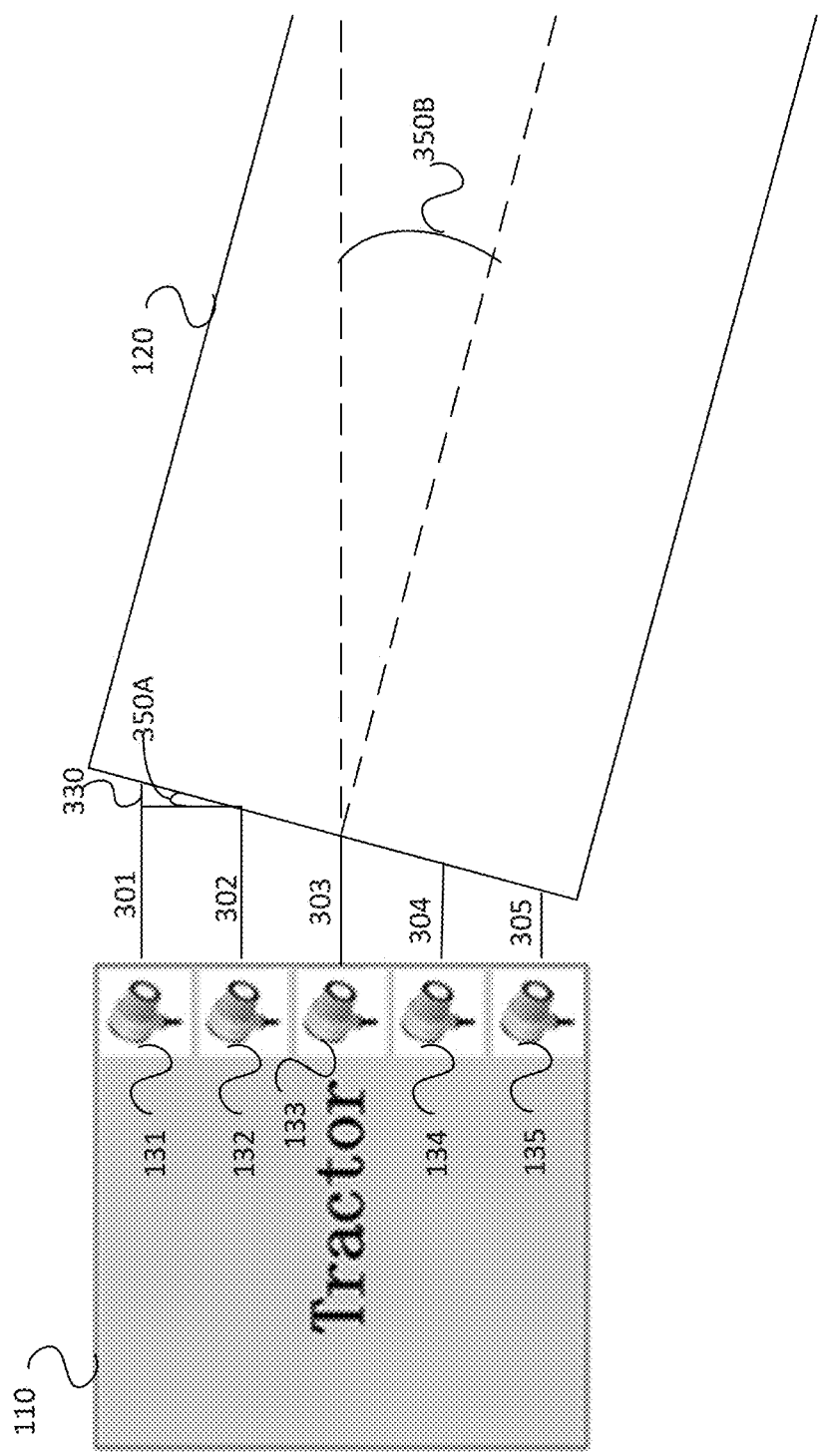
FIG. 3B depicts another illustration showing a trailer at an angle to a tow vehicle, in accordance with some example embodiments.

FIG. 3B depicts another illustration showing a trailer at an angle to a tow vehicle, in accordance with some example embodiments. FIG. 3B shows distances and angles related to determining the trailer angle and is further described below with respect to Equation 1.

Figure 4:
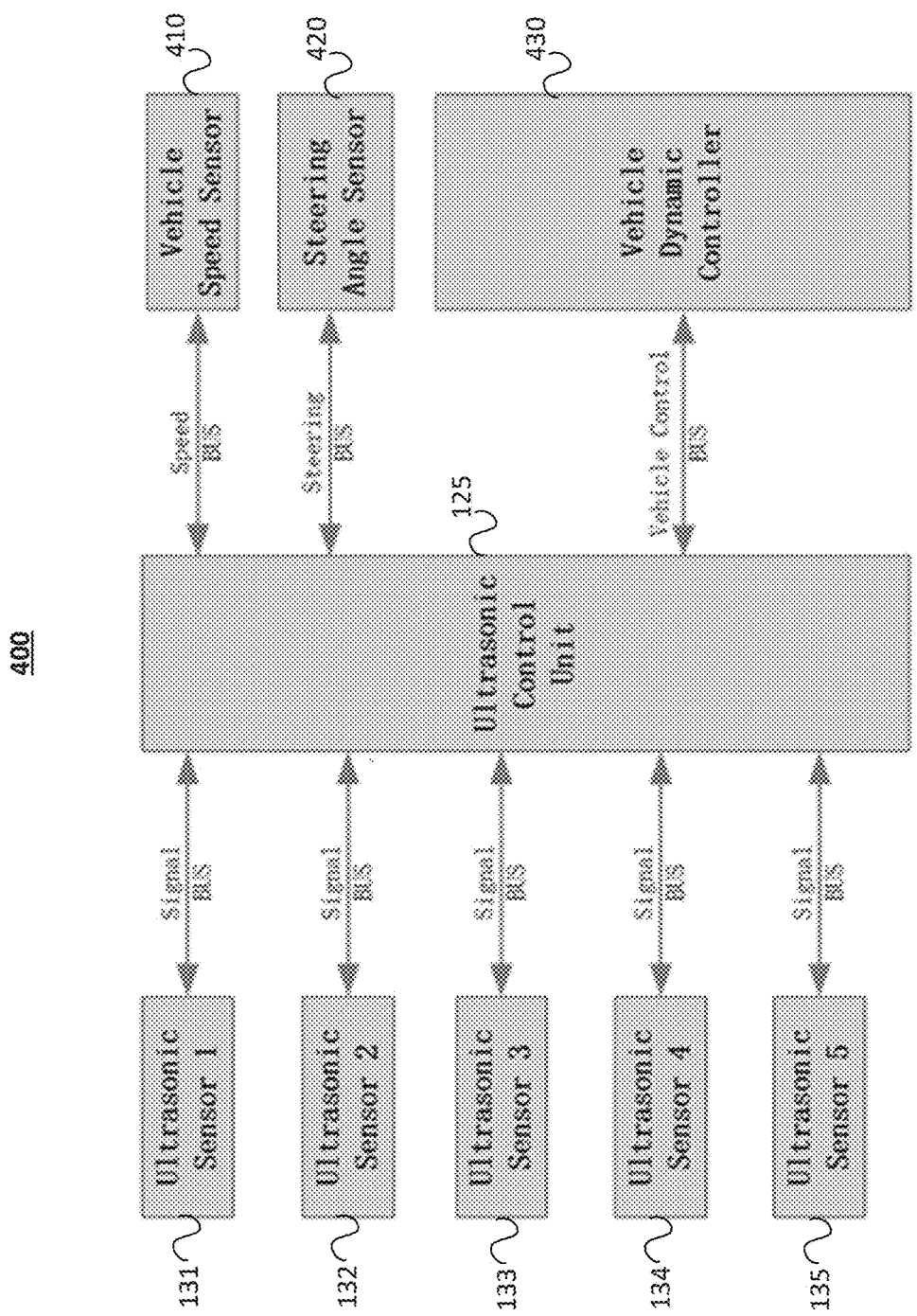
FIG. 4 depicts an example of an apparatus, in accordance with some example embodiments.

FIG. 4 at 400 depicts an apparatus, in accordance with some example embodiments. FIG. 4 includes ultrasonic sensors 131-135, ultrasonic control unit (UCU) 125, vehicle speed sensor 410, steering angle sensor 420, and vehicle dynamics controller 430.

Ultrasonic sensors 131-135 include a communications interface to communicate with UCU 125. For example, commands such as powering-up or down each ultrasonic sensor, commanding each sensor to take a distance measurement, commands related to averaging distance values at each sensor, and others may be sent from UCU 125 to the ultrasonic sensors 131-135 individually or together. Data may be sent from each ultrasonic sensor to the UCU such as distance data, and sensor status and health information. UCU 125 may perform a process to determine the trailer angle. The UCU may receive vehicle speed information from the vehicle speed sensor 410 and/or steering angle information from steering angle sensor 420 via a dedicated or standard interface such as an on-board diagnostics (OBD) or another interface. The UCU may interface to a vehicle dynamics controller such as ESC or VSC or other stability management device in the vehicle.

Figure 5:
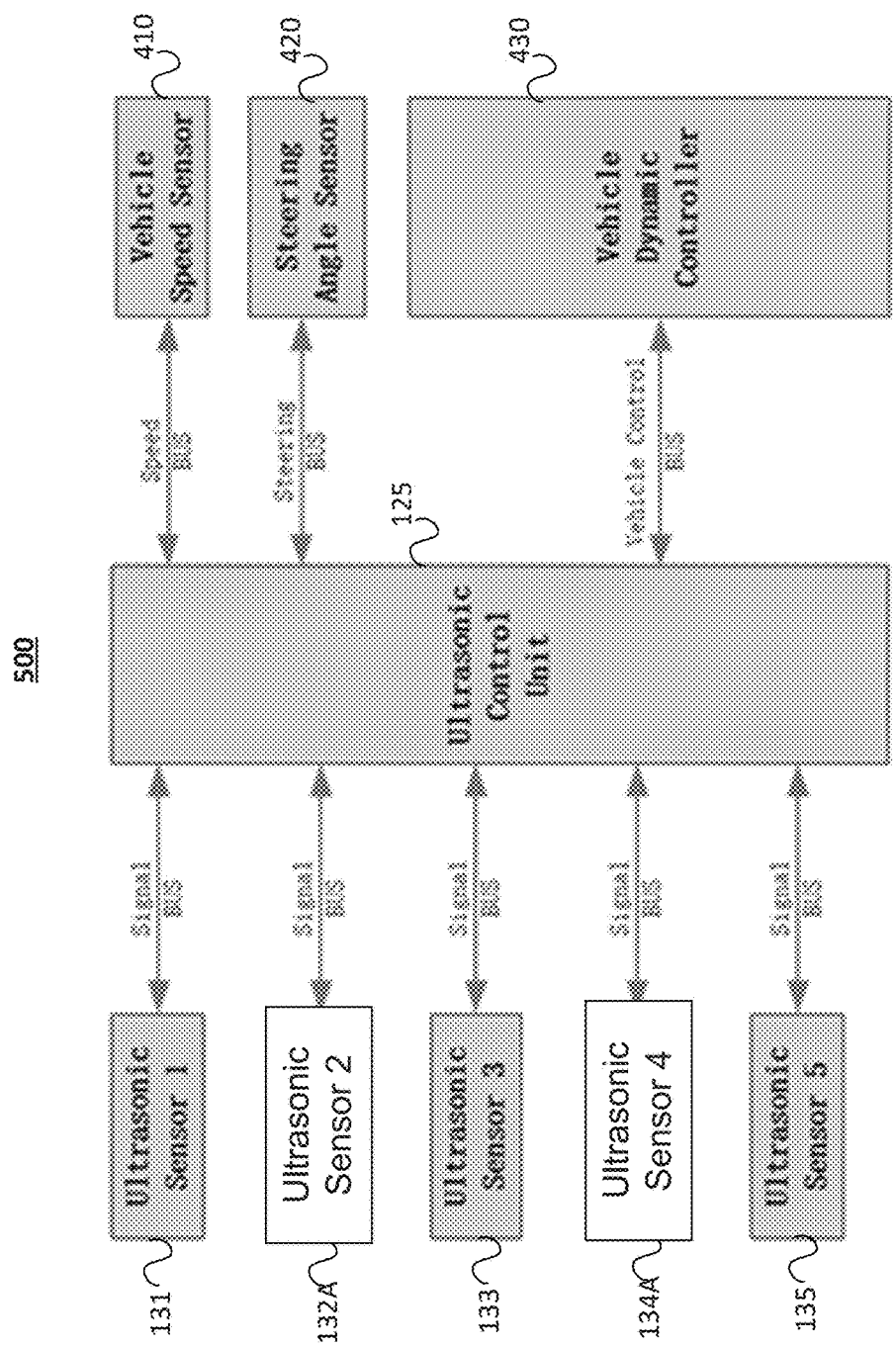
FIG. 5 depicts an example of an apparatus where two sensors are not operational, in accordance with some example embodiments.

FIG. 5 depicts an example of an apparatus where two sensors are not operational, in accordance with some example embodiments. In the example of FIG. 5, ultrasonic sensors 132A and 134A are not operational due to one or more types of failures. The UCU may use data from the remaining sensors 131, 133, and 135 to determine the trailer angle. Use of fewer ultrasonic sensors (3 instead of 5) may cause a reduction in the accuracy or resolution of the trailer angle, but may be sufficient to operate the tractor trailer safely. FIG. 5 is an illustrative example where two ultrasonic sensors are inoperable. Other combinations of sensors may fail resulting in similar reduced performance as well.

Figure 6:
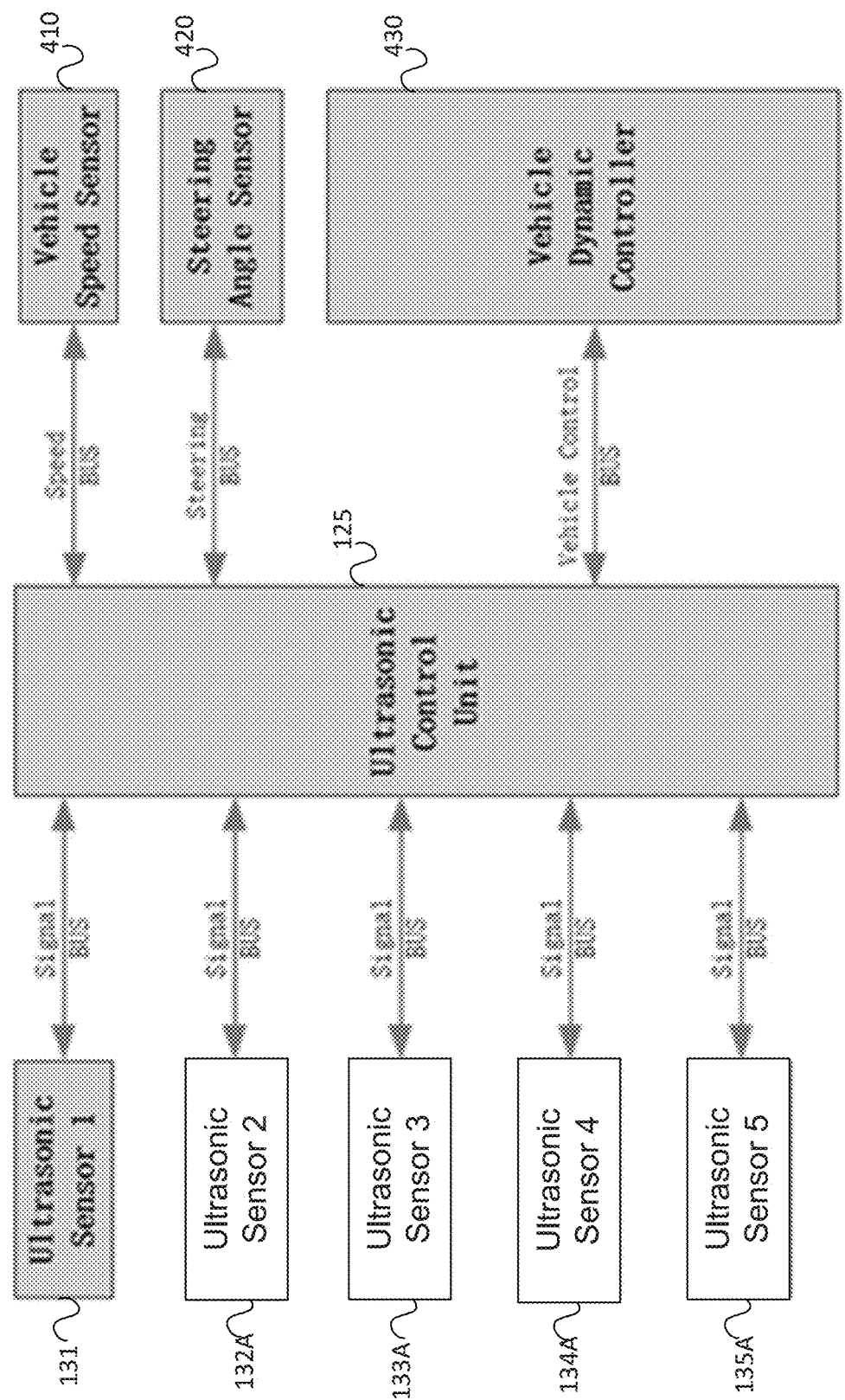
FIG. 6 depicts an example of an apparatus where four sensors are not operational, in accordance with some example embodiments.

FIG. 6 depicts an example of an apparatus where four sensors are not operational, in accordance with some example embodiments. In the example of FIG. 6, ultrasonic sensors 132A. 133A, 134A, and 135A are not operational due to a one or more types of failures. The UCU may use data from the remaining sensor 131 to determine the trailer angle. Use of fewer ultrasonic sensors (1 instead of 5) may cause a reduction in the accuracy or resolution of the trailer angle, but may be sufficient to operate the tractor trailer safely. FIG. 6 is an illustrative example where four ultrasonic sensors are inoperable. Other combinations of sensors may fail resulting in reduced performance as well.

FIG. 7 depicts a process 700, in accordance with some example embodiments. The trailer angle may be determined using the process 700.

At 710, the process includes determining, by the ultrasonic sensors 131-135, the distances 201-205 to the trailer when trailer is in a neutral position (the trailer is in line with tractor). These values may be sent to the UCU and stored in memory such as a nonvolatile memory in the UCU. The neutral position may be determined when the steering angle is near zero and the tractor trailer velocity is greater than about 10 km/h. The distance values may be averaged or filtered over a period of time such as 1-5 seconds (or another time period). These stored values may be used as long as the tractor is attached to the same trailer. If a new trailer is attached to the tractor or the trailer is removed and then re-attached, the neutral distances may be determined again.

At 720, the trailer angle may be determined based the current distances 301-305, the geometrical relationships between the sensors and the tractor and trailer, and the distances determined at 710. As the tractor trailer travels, the ultrasonic sensors 131-135 periodically, intermittently, or continuously determine the distances between the tractor and trailer. When the tractor turns, the determined distances change. For example, when the FIG. 3A tractor 110 and trailer 120 turn left (as viewed from the top), distance 301 is greatest, followed by 302, 303, 304, and 305 which is the smallest distance. If the tractor were turning right, distance 305 would be greatest 301 the smallest, and so on. In some example embodiments, angles may be determined for ultrasonic sensors 131, 132, 134, and 135 but not sensor 133 which may be used for initial angle determination.

Referring to FIGS. 3A and 3B, the following equation may be used to determine the trailer angle at a first ultrasonic sensor:

$$A_1 = \arctan((D_{1\text{-}1} - D_{1\text{-}2})/\text{Dis1}) \qquad \text{Equation 1}$$

where $A_1$ refers to the trailer angle 350B in FIG. 3B at ultrasonic sensor 131, distance $D_{1\text{-}1}$ is distance 301, distance $D_{1\text{-}2}$ is distance 302, distance $D_{1\text{-}1} - D_{1\text{-}2}$ distance 330, and distance Dis1 is distance 311. By symmetry angles 350A and 350B have the same value which is equal to the trailer angle. A similar equation may be expressed for angles at additional ultrasonic sensors as $A_2$, $A_3$, and so on where $A_2$ refers to the trailer angle at ultrasonic sensor 132, and so on, $D_{2-1}$ is distance 202, and so on, $D_{2-2}$ s distance 302, and so on, and Dis2 is distance 312, Dis4 is distance 313, and Dis5 is distance 314, and so on.

At 730, for each angle value ($A_1$, $A_2$, $A_4$, and $A_5$) a standard deviation $SD_1$, $SD_2$, $SD_3$, $SD_5$, may be determined. The noise from each ultrasonic sensor may be used to determine the standard deviation.

An average value may be determined for 100 angle determinations of $A_1$ from:

$$\underline{A_1} = \frac{A1_1 + A1_2 + \ldots + A1_{100}}{100} \qquad \text{Equation 2}$$

The standard deviation may then be expressed as:

$$SD_1 = \sqrt{\frac{(A1_1 - \underline{A1})^2 + \ldots + (A1_{100} - \underline{A1})^2}{100}} \qquad \text{Equation 3}$$

At 740, a weighting of the determined angle values from the different ultrasonic sensors based on their standard deviations may be expressed as:

$$W_1 = 1 - SD_1/(SD_1 + SD_2 + SD_4 + SD_5)$$

$$W_2 = 1 - W_1 - SD_2/(SD_2 + SD_4 + SD_5)$$

$$W_4 = 1 - W_1 - W_2 - SD_4/(SD_4 + SD_5)$$

$$W_5 = 1 - W_1 - W_2 - W_4 \qquad \text{Equations 4}$$

Because the back of the tractor and the front of the trailer are structural and essentially rigid, in a perfect world without noise and imperfections, angles $A_1$, $A_2$, $A_4$, and $A_5$ would have the same value, but because of noise and imperfections they may differ in average and the standard deviation of each is a measure of the "noisiness" of each.

At 760, a weighted trailer angle may be expressed as:

$$A_O = W_1 * A_1 + W_2 * A_2 + W_4 * A_4 + W_5 * A_5 \qquad \text{Equation 5}$$

At 770, an error and confidence level of the weighted trailer angle may be expressed as:

$$Q_{Error} = W_1 * SD_1 + W_2 * SD_2 + W_4 * SD_4 + W_5 * SD_5 \qquad \text{Equation 7}$$

$$A_{CL} = [A_O - S_{Error}, A_O + A_{Error}] \qquad \text{Equation 7}$$

In some example embodiments, zero detection of the trailer angle may be performed. To begin zero detection, an error between the last angle output and current angle value may be 5 degrees or larger (or another value such as 4 degrees). Ultrasonic sensor 133 may be used as an initial reference of a zero angle for the other ultrasonic sensors. During the zero detection, each angle may be calculated using the following formulas:

$$Q_1 = \arctan((D_{1-2} - D_{3-1})/\text{Dis1})$$

$$A_2 = \arctan((D_{2-2} - D_{3-1})/\text{Dis2})$$

$$A_4 = \arctan((D_{4-2} - D_{3-1})/\text{Dis4})$$

$$A_5 = \arctan((D_{5-2} - D_{3-1})/\text{Dis5}), \qquad \text{Equations 8}$$

where $D_{1-2}$, $D_{2-2}$, $D_{4-2}$, $D_{5-2}$ are the current distance measurements of sensors 131, 132, 134, and 135, respectively. Sensor 133 may be mounted in the middle of the tractor as shown in FIGS. 3A and 3B. The relative movement of the trailer and/or trailer angle will not influence, or will negligibly influence, the distance measured by sensor 133. Accordingly, sensor 133 may be used as a reference for the system and to compare to the distances from sensors 131, 132, 134, and 135.

In some example embodiments, a process 700 may be performed to determine a trailer angle between a trailer and a vehicle. At 720, the process includes receiving, from each of one or more ultrasonic sensors, a distance between each ultrasonic sensor and a front-end of the trailer attached to the vehicle. At 720, the process includes determining one or more angles, each angle corresponding to a distance received from the one or more ultrasonic sensors, wherein each angle is between the vehicle and the trailer, and wherein a trailer angle is determined from the one or more angles. The process may further include features described above in various combinations.

Figure 8:
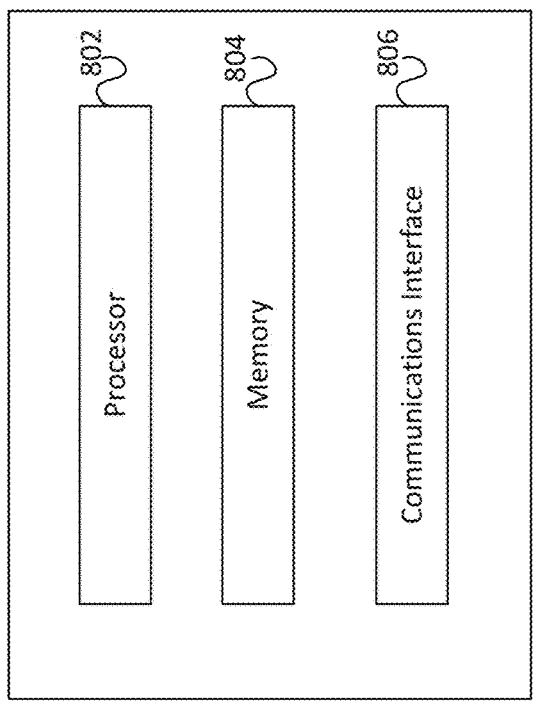
FIG. 8 depicts an example of an apparatus, in accordance with some example embodiments.

FIG. 8 depicts an example of an apparatus 800 that can be used to implement some of the techniques described in the present document. For example, the hardware platform 800 may implement the process 700, or other processes described above, and/or may implement the various modules described herein. The hardware platform 800 may include a processor 802 that can execute code to implement a method. The hardware platform 800 may include a memory 804 that may be used to store processor-executable code and/or store data. The hardware platform 800 may further include a communication interface 806. For example, the communication interface 806 may implement one or more wired or wireless communication protocols (Ethernet, LTE, Wi-Fi, Bluetooth, and so on).

Implementations of the subject matter and the functional operations described in this patent document can be implemented in various systems, semiconductor devices, ultrasonic devices, digital electronic circuitry, or in computer software, firmware, or hardware, including the structures disclosed in this specification and their structural equivalents, or in combinations of one or more of them. Implementations of aspects of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A system, comprising:
   one or more ultrasonic sensors, wherein each ultrasonic sensor is mountable to a vehicle to determine a distance from the ultrasonic sensor to a front-end of a trailer attached to the vehicle, wherein the one or more ultrasonic sensors are arranged in a two-dimensional pattern in a plane that is perpendicular to an axis between the vehicle and the trailer; and
   an ultrasonic control unit configured to receive the distance from each of the one or more ultrasonic sensors via a communications interface, wherein the ultrasonic control unit determines one or more angles, each angle corresponding to a distance received from the one or more ultrasonic sensors, wherein each angle is between the vehicle and the trailer, and wherein the ultrasonic control unit determines the trailer angle from the one or more angles, wherein a first angle corresponding to a first ultrasonic sensor is determined based on one or more geometrical relationships between a position of the first ultrasonic sensor and the front-end of the trailer, wherein the first angle is determined from:
      a first neutral distance between the first ultrasonic sensor and the front-end of the trailer when the trailer is in line with the vehicle,
      a first angled distance when the trailer is angled with respect to the vehicle, and
      a first offset distance between the center of the first ultrasonic sensor and the center of the vehicle, wherein the first neutral distance is determined when a steering angle of the vehicle is about zero degrees and the vehicle is travelling at about 10 kilometers per hour or more.

2. The system of claim 1, wherein the first neutral distance is averaged or filtered over a period of time.

3. The system of claim 2, wherein the one or more ultrasonic sensors comprise an ultrasonic sensor oriented to illuminate the front-end of the trailer at a perpendicular angle when the trailer angle is not zero degrees.

4. The system of claim 2, wherein the ultrasonic control unit comprises:
   at least one processor; and
   at least one memory storing executable instructions that when executed by the at least one processor perform at least:
      determining the first angle corresponding to the first ultrasonic sensor as:
      $$A1 = \arctan((D1\text{-}1 - D1\text{-}2)/\text{Dis}1),$$
   wherein A1 is the first angle between the vehicle and the trailer,
   wherein D1-1 is a first neutral distance between the first ultrasonic sensor and the frontend of the trailer, wherein the first neutral distance is determined when the trailer is in line with the vehicle,
   wherein D1-2 is a first angled distance between the first ultrasonic sensor and the frontend of the trailer, wherein the first angled distance is determined when the trailer is angled with respect to the vehicle, and
   wherein Dis1 is a first offset distance, wherein the first offset distance is between the center of the first ultrasonic sensor and the center of the vehicle.

5. The system of claim 1, wherein the trailer angle is determined as an average angle of the one or more angles.

6. The system of claim 5, wherein the average angle is weighted based on a standard deviation for distance values received at the ultrasonic control unit from each of the one or more ultrasonic sensors.

7. The system of claim 6, wherein the ultrasonic control unit determines an error interval and a confidence level based on the standard deviation for distance values received at the ultrasonic control unit from each of the one or more ultrasonic sensors.

8. A method, comprising:
receiving, from each of one or more ultrasonic sensors attached to the vehicle, information about a distance between each ultrasonic sensor and a front-end of the trailer attached to the vehicle; and
determining one or more angles, each angle corresponding to the information about the distance received from the one or more ultrasonic sensors, wherein each angle is an estimate of alignment between the vehicle and the trailer, and wherein a trailer angle is determined from the one or more angles,
wherein a first angle corresponding to a first ultrasonic sensor is determined based on one or more geometrical relationships between a position of the first ultrasonic sensor and the front-end of the trailer, and further wherein the first angle is determined from:
a first neutral distance between the first ultrasonic sensor and the front-end of the trailer when the trailer is in line with the vehicle;
a first angled distance when the trailer is angled with respect to the vehicle; and
a first offset distance between the center of the first ultrasonic sensor and the center of the vehicle,
the first neutral distance determined when a steering angle of the vehicle is about zero degrees and the vehicle is travelling at about 10 kilometers per hour or more.

9. The method of claim 8, wherein the first neutral distance is averaged or filtered over a period of time.

10. The method of claim 9, further comprising:
determining the first angle corresponding to the first ultrasonic sensor as:

$$A1 = \arctan((D1\text{-}1 - D1\text{-}2)/\text{Dis}1),$$

wherein A1 is the first angle between the vehicle and the trailer,
wherein D1-1 is a first neutral distance between the first ultrasonic sensor and the frontend of the trailer, wherein the first neutral distance is determined when the trailer is in line with the vehicle,
wherein D1-2 is a first angled distance between the first ultrasonic sensor and the frontend of the trailer, wherein the first angled distance is determined when the trailer is angled with respect to the vehicle, and
wherein Dis1 is the first offset distance, and wherein the first offset distance is between the center of the first ultrasonic sensor and the center of the vehicle.

11. The method of claim 8, wherein the trailer angle is determined as an average angle of the one or more angles.

12. The method of claim 11, wherein the average angle is weighted based on a standard deviation for distance values received from each of the one or more ultrasonic sensors.

13. The method of claim 12, wherein an error interval and a confidence level is determined based on the standard deviation for the distance values received from each of the one or more ultrasonic sensors.

14. The method of claim 8, wherein the one or more ultrasonic sensors comprise an ultrasonic sensor oriented to illuminate the frontend of the trailer at a perpendicular angle when the trailer angle is not zero degrees.

15. The method of claim 8, wherein the one or more ultrasonic sensors are arranged in a two-dimensional pattern in a plane that is perpendicular to an axis between the vehicle and the trailer.

16. A non-transitory computer readable medium storing executable instructions that when executed by at least one processor perform at least:
receiving, any of vehicle speed information from a vehicle speed sensor, steering angle information from a steering angle sensor, or both vehicle speed information from the vehicle speed sensor and the steering angle information from the steering angle sensor;
receiving, from each of one or more ultrasonic sensors, a distance between each ultrasonic sensor and a front-end of the trailer attached to the vehicle;
determining one or more angles, each angle corresponding to a distance received from the one or more ultrasonic sensors, wherein each angle is between the vehicle and the trailer, and wherein a trailer angle is determined from the one or more angles, wherein a first angle corresponding to a first ultrasonic sensor is determined based on one or more geometrical relationships between a position of the first ultrasonic sensor and the front-end of the trailer, wherein the first angle is determined from:
a first neutral distance between the first ultrasonic sensor and the front-end of the trailer when the trailer is in line with the vehicle,
a first angled distance when the trailer is angled with respect to the vehicle, and
a first offset distance between the center of the first ultrasonic sensor and the center of the vehicle, wherein the first neutral distance is determined when a steering angle of the vehicle is about zero degrees and the vehicle is travelling at about 10 kilometers per hour or more; and
sending the trailer angle to a vehicle dynamics controller, electronic stability controller, or vehicle stability controller of the trailer.

17. The non-transitory computer readable medium of claim 16, wherein the first neutral distance is averaged or filtered over a period of time.

18. The non-transitory computer readable medium of claim 17, wherein the one or more ultrasonic sensors comprise an ultrasonic sensor oriented to illuminate the front-end of the trailer at a perpendicular angle when the trailer angle is not zero degrees.

19. The non-transitory computer readable medium of claim 18, wherein the one or more ultrasonic sensors are arranged in a two-dimensional pattern in a plane that is perpendicular to an axis between the vehicle and the trailer.

20. The non-transitory computer readable medium of claim 17, wherein the executable instructions further cause at least:
determining the first angle corresponding to a first ultrasonic sensor as:

$$A1 = \arctan((D1\text{-}1 - D1\text{-}2)/\text{Dis}1),$$

wherein A1 is the first angle between the vehicle and the trailer,
wherein D1-1 is a first neutral distance between the first ultrasonic sensor and the frontend of the trailer, wherein the first neutral distance is determined when the trailer is in line with the vehicle,
wherein D1-2 is a first angled distance between the first ultrasonic sensor and the frontend of the trailer, wherein the first angled distance is determined when the trailer is angled with respect to the vehicle, and wherein Dis1 is a first offset distance, and wherein the first offset distance is between the center of the first ultrasonic sensor and the center of the vehicle.

* * * * *

UNITED STATES PATENT AND TRADEMARK OFFICE
CERTIFICATE OF CORRECTION

PATENT NO. : 10,942,271 B2
APPLICATION NO. : 16/174980
DATED : March 9, 2021
INVENTOR(S) : Xiaoling Han et al.

It is certified that error appears in the above-identified patent and that said Letters Patent is hereby corrected as shown below:

On the Title Page

Item (74), under "Attorney, Agent, or Firm", in Column 2, Line 2, delete "Perkins Cole, LLP" and insert -- Perkins Coie, LLP --, therefor.

In the Specification

In Column 6, Line 52, delete "greatest" and insert -- greatest, --, therefor.

In Column 7, Line 2, delete "s" and insert -- is --, therefor.

In Column 7, Line 6, delete "$SD_3$," and insert -- $SD_4$, --, therefor.

In Column 7, Line 45, delete "$Q_{Error}$" and insert -- $A_{Error}$ --, therefor.

In Column 7, Line 47, delete "$A_{CL}=[A_O-S_{Error}, A_O+A_{Error}]$" and insert -- $A_{CL}=[A_O-A_{Error}, A_O+A_{Error}]$ --, therefor.

In Column 7, Line 56, delete "$Q_1=\arctan((D_{1-2}-D_{3-1})/Dis1)$" and insert -- $A_1=\arctan((D_{1-2}-D_{3-1})/Dis1)$ --, therefor.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*